United States Patent
Grossauer et al.

(10) Patent No.: US 9,539,663 B2
(45) Date of Patent: Jan. 10, 2017

(54) DEVICE AND METHOD FOR CONTACTING A WELDING ROD AND CONTACT SHELL

(75) Inventors: Wolfgang Grossauer, Windischgarsten (AT); Manfred Hubinger, Kremsmuenster (AT); Andreas Leonhartsberger, St. Florian bei Linz (AT)

(73) Assignee: Fronius International GmbH, Pettenbach (AU)

( * ) Notice: Subject to any disclaimer, the term of this patent is extended or adjusted under 35 U.S.C. 154(b) by 976 days.

(21) Appl. No.: 12/998,577

(22) PCT Filed: Nov. 27, 2009

(86) PCT No.: PCT/AT2009/000463
§ 371 (c)(1),
(2), (4) Date: May 5, 2011

(87) PCT Pub. No.: WO2010/060128
PCT Pub. Date: Jun. 3, 2010

(65) Prior Publication Data
US 2011/0204035 A1     Aug. 25, 2011

(30) Foreign Application Priority Data

Nov. 27, 2008  (AT) .................................. 1852/2008
Nov. 26, 2009  (AT) .................................. 1880/2009

(51) Int. Cl.
*B23K 9/12*   (2006.01)
*B23K 9/173*  (2006.01)
(Continued)

(52) U.S. Cl.
CPC ............. *B23K 9/123* (2013.01); *B23K 9/1336* (2013.01); *B23K 9/173* (2013.01); *B23K 9/287* (2013.01)

(58) Field of Classification Search
CPC ....... B23K 9/122; B23K 9/123; B23K 9/1336; B23K 9/173; B23K 9/287
(Continued)

(56) References Cited

U.S. PATENT DOCUMENTS 6,559,416 B1 *  5/2003  Steenis et al. ............ 219/137.61
6,852,950 B2 *  2/2005  Giese ..................... B23K 9/295
                                                    219/137.31
(Continued)

FOREIGN PATENT DOCUMENTS

DE       36 43 640        6/1988
DE        3643640      *  6/1988
(Continued)

OTHER PUBLICATIONS

Japanese Office Action dated Dec. 18, 2012 in Japanese Patent Application No. 2011-537794 along with an English translation of same.
(Continued)

*Primary Examiner* — David Angwin
*Assistant Examiner* — Frederick Calvetti
(74) *Attorney, Agent, or Firm* — Collard & Roe, P.C.

(57) ABSTRACT

The invention relates to a device and a method for contacting a welding wire (13) in a welding torch (10), including at least two contact shells (31) having a contact area (32) for contacting the welding wire (13), and to a contact shell (31) for contacting a welding wire (13). In order to make the contact of the welding wire as constant and permanent as possible during the lifetime of a contacting device, the contact shells (31) have a holding section (48) and are arranged inside a sleeve (37) to define a rotational axis (43), the sleeve (37) being fastened to a nozzle pipe (38) having an integrated pressure mechanism (36), and the pressure mechanism (36) being adapted to exert pressure (33) on the
(Continued)

Figure 1:
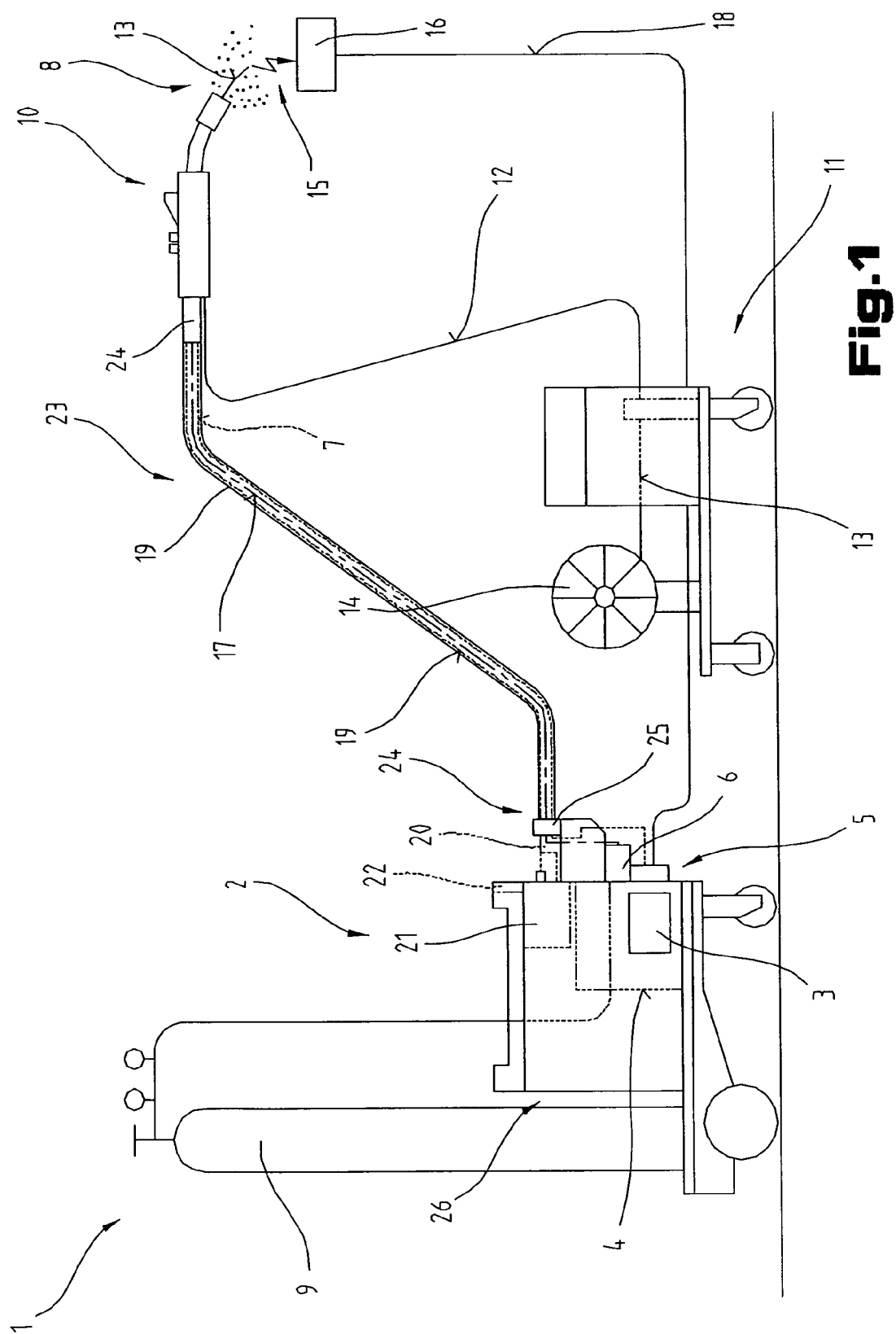

contact shells (31). The sleeve (37) includes a holding device (42) for exerting a counter-force (34) onto the contact shells (31). The welding wire (13) is contacted in the contact area (32) of the contact shells (31) with a contact force (35).

13 Claims, 7 Drawing Sheets

(51) Int. Cl.
*B23K 9/133* (2006.01)
*B23K 9/28* (2006.01)

(58) Field of Classification Search
USPC ............ 219/137.31, 137.61, 137.44, 137.51, 219/137.52, 137.42
IPC ...................................... B23K 9/122
See application file for complete search history.

(56) References Cited

U.S. PATENT DOCUMENTS 8,304,692 B2 * 11/2012 Ohkubo ................. B23K 9/123
219/137.31

| 2004/0026395 | A1 * | 2/2004 | Giese | B23K 9/295 219/137.61 |
|---|---|---|---|---|
| 2005/0218129 | A1 * | 10/2005 | Kensrue et al. | 219/137.31 |
| 2008/0035623 | A1 * | 2/2008 | Hutchison | 219/136 |
| 2010/0038345 | A1 | 2/2010 | Nishimura | |

FOREIGN PATENT DOCUMENTS

| JP | 2000-153360 | | 6/2000 |
|---|---|---|---|
| JP | 2000153360 | * | 6/2000 |
| JP | 2002-59265 | | 2/2002 |
| JP | 2002059265 | * | 2/2002 |
| JP | 2002-224837 | | 8/2002 |
| JP | 2002224837 | * | 8/2002 |
| WO | WO 2008/018594 | | 2/2008 |
| WO | WO2008018594 | * | 2/2008 |
| WO | WO2009041368 | * | 4/2009 |

OTHER PUBLICATIONS

International Search Report.
Austrian Office Action dated Sep. 16, 2010 and English translation of relevant parts.

* cited by examiner

DEVICE AND METHOD FOR CONTACTING A WELDING ROD AND CONTACT SHELL

CROSS REFERENCE TO RELATED APPLICATIONS

This application is the National Stage of PCT/AT2009/000463 filed on Nov. 27, 2009, which claims priority under 35 U.S.C. §119 of Austrian Application No. A 1852/2008 filed on Nov. 27, 2008 and Austrian Application No. A 1880/2009 filed on Nov. 26, 2009, the disclosure of each of which is incorporated by reference. The international application under PCT article 21(2) was not published in English.

The invention relates to a device for contacting a welding wire in a welding torch, comprising at least two contact shells having a contact area for contacting the welding wire.

The invention further relates to a contact shell for contacting a welding wire in a welding torch, said contact shell having a contact area for the welding wire at one end thereof.

Finally, the invention relates to a method for contacting a welding wire in a welding torch, wherein the welding wire is contacted in a contact area of at least two contact shells.

The present invention relates to the contacting of a welding wire in a welding torch with a constant contact force at a defined contact point. This results in a constant transfer of current to the welding wire, so that a constant welding quality may be guaranteed. For achieving a constant contact force, the factors described in the following have to be taken into account. The substantial factors are the tolerance of the diameter of the welding wire, dirt, and abrasion. This means in detail that the diameter is not exactly constant along the length of the welding wire. Likewise, abrasion is produced in the wire core due to the conveyance of the welding wire, said abrasion also being conveyed along to the contact places. Additionally, dirt collects on the coil onto which the welding wire is wound, said dirt also being conveyed to the contact points. In addition, the coil causes a certain deformation of the welding wire, the so-called cast. Likewise, the contact points are ground during the conveyance of the welding wire. These factors cause a variation of the diameter of the welding wire. Thus, the contact points have to be correspondingly variable to be able to ensure the desired constant contact force.

WO 2008/018594 A1 or JP 2002059265 A disclose devices for contacting a welding wire. These devices exert, via a spring, a pressure on a movable contact member that is consequently pressed against a cone of a protective sleeve, and the opening arranged in the contact member is correspondingly adapted to the welding wire, and the welding wire is contacted with a wire contact force. Thus, an axial force of the spring is converted into a force acting radially on the welding wire, the wire contact force.

It is of disadvantage that the initially described factors are not taken into account with such constructions of a contacting device. As already mentioned, for an optimum and low-wear contacting during the welding process, the movable contact member permanently has to adapt to the welding wire with a defined wire contact force. This adaptation has to be effected due to a minimal movement of the contact members which has to be enabled by the contacting system. In prior art, the following disadvantages, however, result in this respect.

Any movement of the contact members results in differently directed friction forces at the cone of the protective sleeve, which are, due to the characteristic of the device, in the order of magnitude of the spring force itself that constitutes the largest force. The reason for this is that the contact members have to move against the spring force so as to adapt to the welding wire. Thus, the friction forces change and an actual wire contact force results which deviates strongly from the defined wire contact force and hence is no longer optimum. This means, however, also that the friction forces and the wire contact forces are dependent on each other.

Likewise, a contact force between the contact member and the cone arises due to the construction. Thus, the cone effects both the contact force and the wire contact force, and hence the wire contact force additionally also depends on the contact force. Thus, for the defined wire contact force there results a contact force ranging in the order of magnitude of the wire contact force. The contact force should, however, be substantially higher than the wire contact force since, in addition to the electric current, the contact heat should also be transferred to the protective sleeve there so as to cool the contact member as good as possible.

A change of the wire conveying direction which takes place in the case of special processes also has a great influence on the wire contact forces arising, since it is not possible to react to such quick changes of movement.

It is also disadvantageous that the contact member, due to the construction thereof, always guides the welding wire centrically. Thus, it is not possible for the welding wire to evade in any direction. Likewise, the welding wire is not just contacted by the contact member, but also guided by same. This causes that possible lateral guide forces due to wire cast and torch angle also have an influence on the wire contact forces, since the contact members are ground more quickly.

In summary, there may be said that, due to the dependency of the forces, the wire contact force required for the constant contacting changes with any influence.

It is also disadvantageous with those prior art designs in which the contact member is screwed that the contact force on the welding wire cannot be readjusted automatically, since the contact member does not have the required flexibility.

It is an object of the invention to provide a contact of the welding wire as constant and permanent as possible during the lifetime of a contacting device of a welding torch, and to avoid or reduce the drawbacks of prior art.

This object is solved by the above-mentioned contacting device in which the contact shells have a holding section and are arranged inside a sleeve to define a rotational axis, and in which the sleeve is fastened to a nozzle stock having an integrated pressure mechanism, said pressure mechanism being designed to exert pressure on the contact shells, and said sleeve comprising a holding device for exerting a counter-force onto the contact shells, and said welding wire being contacted in the contact area of the contact shells with a contact force. It is of advantage that a distinctly improved regulation and transfer of the contact force to the welding wire is possible. Thus, it is possible to adjust the contact force optimally to the material of the welding wire due to the movable contact shells. This has the further advantage that the conveying force for the welding wire may be kept to a minimum and an optimal and low-friction current transfer to the welding wire is performed simultaneously. Thus, the abrasion of the welding wire is also minimal. Likewise, the abrasion of the contact shells is minimal and/or is compensated by the movability of the contact shells, so that a permanent contacting is given. Thus, the arc stability and, in further consequence, the welding quality are increased. It is also of advantage that the contact shells can be exchanged quickly and in a simple manner and can be used for different wire welding diameters, at least in a certain range.

Advantageously, two contact points for contacting with the holding device of the sleeve are defined at each contact shell at the ends of the rotational axis, by which the contact shells are held movably and a counter-force on the contact shells is exerted by the sleeve. Thus, a permanently safe transfer of current to the contact shells and a safe heat dissipation are achieved without restricting the movability of the contact shells.

By providing means for guiding the welding wire upstream and downstream of the contact area, and the embodiment according to which the contact shells are movable in the contact area by the contact force substantially normally to the welding wire, an optimum adjustment of the contact force on the welding wire is advantageously achieved, since the guiding and the contacting of the welding wire are separated. Thus, an optimum welding result is guaranteed.

In accordance with a further feature of the invention, the holding section is designed as a section of entry of the welding wire and comprises an oval and convex front face, wherein the pressure is exerted on at least a part of the front face. Likewise, the holding section may be widened vis-à-vis the further contact shell, and the transition to the widening may be designed conically. These features enable a deflection of the axial pressure to the radial contact force and an additional adjustment thereof.

If the sleeve comprises a recess corresponding substantially to the contact shells, there is ensured that the contact shells are protected from any external influences by the sleeve.

Inside the sleeve, an insulation bushing is preferably provided for guiding the welding wire. Furthermore, a guide pipe for the welding wire may be positioned in the centre of the pressure mechanism and in a part of the contact shells. These measures advantageously achieve that the welding wire is guided without any problems through the pressure mechanism and current-free to the contact area. It is likewise of advantage that the welding wire is permanently contacted exclusively in the contact area of the contact shells.

It is also of advantage if the pressure mechanism is defined at least of a pressure bolt, a compression spring, and a fixing plate, wherein the pressure bolt is movable substantially along the axis of the welding wire. This enables an adjustment and/or regulation of the pressure, wherein it is also possible to adjust and/or regulate the contact force correspondingly by that.

The object is also solved by the above-mentioned contact shell in which an elevation is defined at a front face of a holding section opposite to the contact area. In this case it is of advantage that, due to the resting of the pressure means on the elevation, the contact shells are freely movable and exert the desired contact force on the welding wire.

By the measures of the further subclaims it is of advantage that the contact shells press against each other by exerting a pressure on the front face in the exit end area, so that the welding wire is permanently contacted with a defined contact force. Likewise, the permanent contacting in the same place is guaranteed.

The object according to the invention is also solved by a contact shell in which a recess is arranged from the contact area to the holding section for receiving a further contact shell that is restricted by lateral and front-side walls and extends up to a level for the guiding of the welding wire, wherein an opening for the welding wire is arranged in the front-side wall. In the case of such a structure of the contact shell, the resulting gap to the further contact shell is not, as with the above-described variant, positioned at the front side, and the assembled contact shells are thus protected better from weld spatters or other pollution.

Advantageously, the front-side wall is positioned upstream of the contact area when viewed in the normal conveying direction of the welding wire.

The lateral walls of the contact shell are preferably substantially positioned to end in front of the holding section.

In accordance with a further feature of the invention, a semicircular recess for receiving a guide pipe is arranged in a level for the guidance of the welding wire, wherein in the assembled state of this contact shell with the further contact shell, this recess of the contact shell defines substantially a bore with a recess of the further contact shell.

The object according to the invention is also solved by a contact shell, the width of which corresponds substantially to the width of the contact area, and which is adapted to be received in a recess of a further contact shell for defining a multi-part contact pipe.

Preferably, the contact shell is designed to be wider in the area of the holding section and to taper in the direction of the contact area.

In accordance with a further feature of the invention, a semicircular recess for receiving a guide pipe is arranged in a level for the guidance of the welding wire, wherein in the assembled state of the contact shell with a further contact shell, this recess defines substantially a bore with a recess of the further contact shell.

The object according to the invention is further solved by a contact shell in which an elevation for applying a pressure is defined at a front face of the holding section opposite to the contact area, and at least two opposite projections are arranged at the front face, wherein the projections are designed to define a rotational axis and the elevation is arranged between the projections, wherein the elevation and the rotational axis are arranged substantially in one level.

Advantageously, the rotational axis to be defined is arranged substantially parallel to the elevation.

In accordance with a further feature of the invention, a face of the projection is designed to taper in the direction of the outer face of the contact shell, in particular in the direction of the contact area.

The object is also solved by the above-mentioned method for contacting a welding wire in a welding torch, wherein an axial pressure is exerted on the contact shells that are held movably in a sleeve, and wherein the contact shells are pressed against a holding device of the sleeve for generating a counter-force, wherein a rotational axis for the contact shells is defined in the holding device for converting the pressure into a radial contact force. Advantages may be taken from the above sections.

Figure 2:
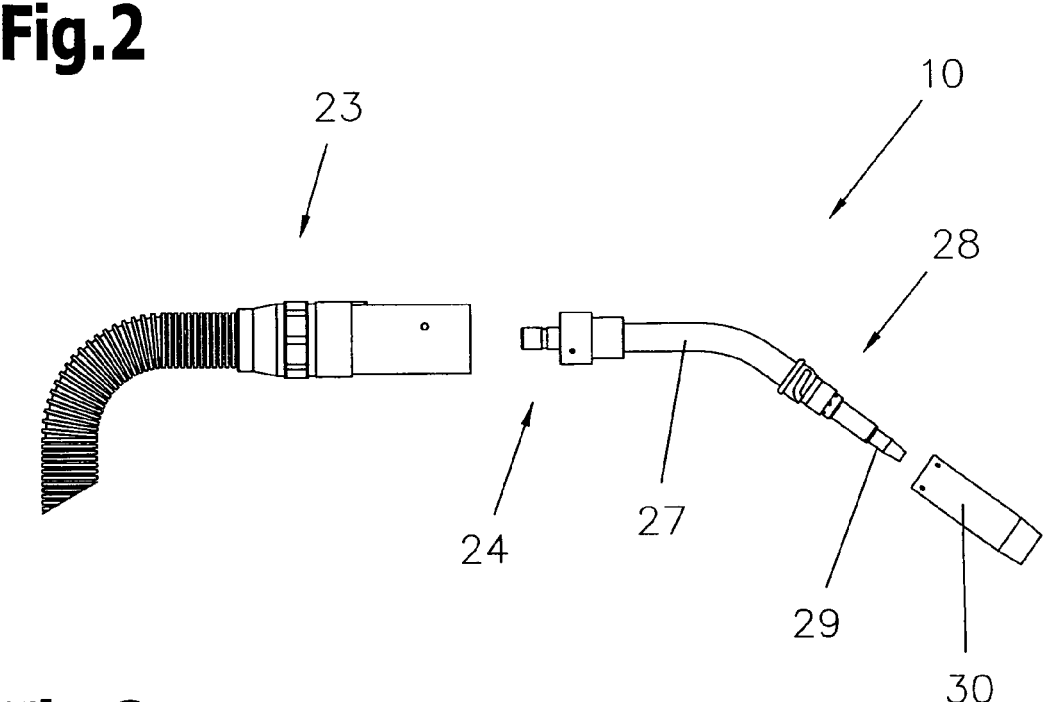
Figure 3:
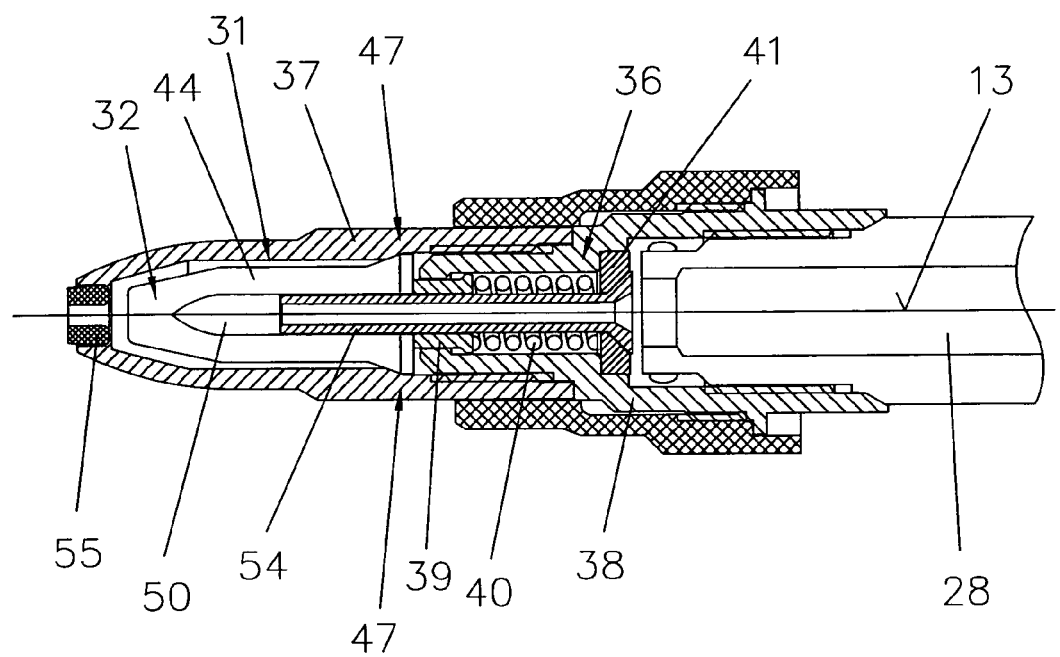
Figure 4:
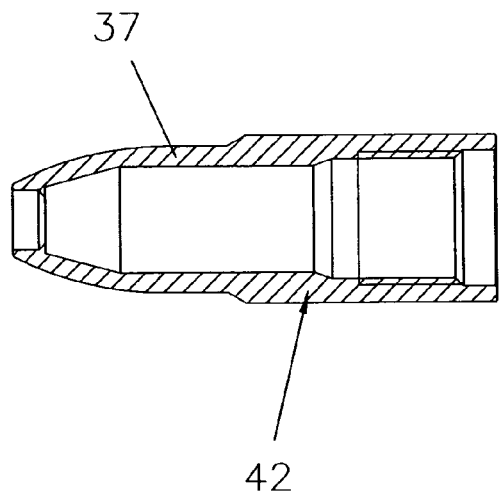
Figure 5:
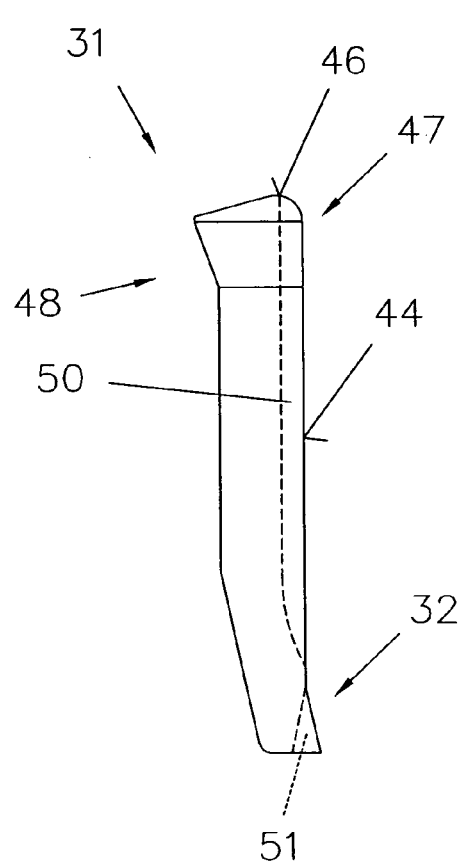
Figure 6:
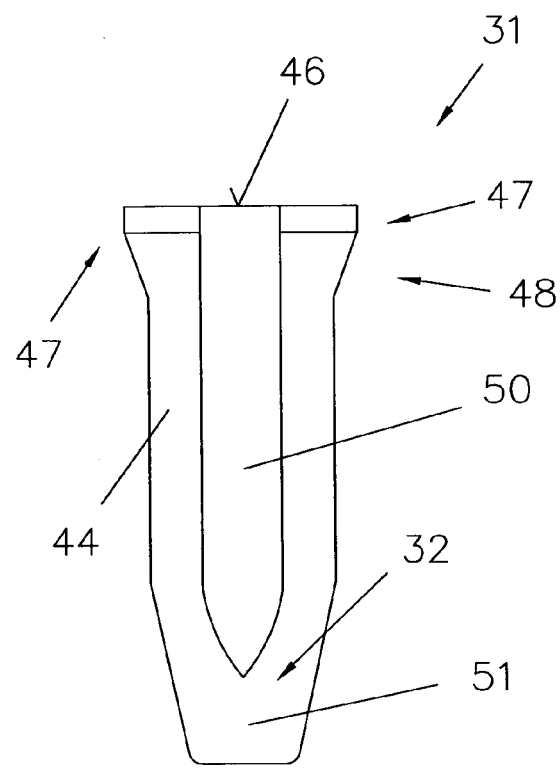
Figure 7:
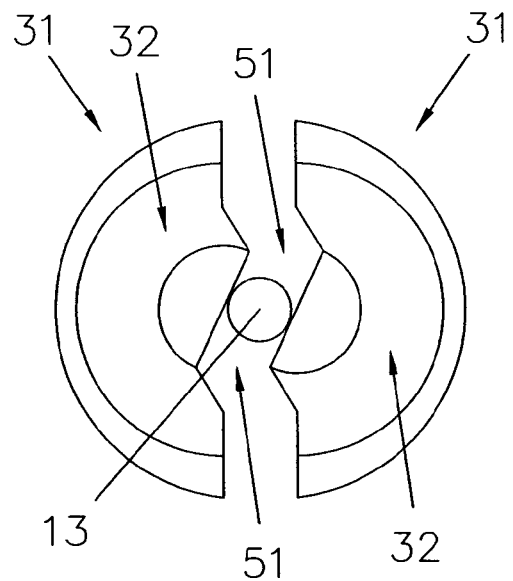
Figure 8:
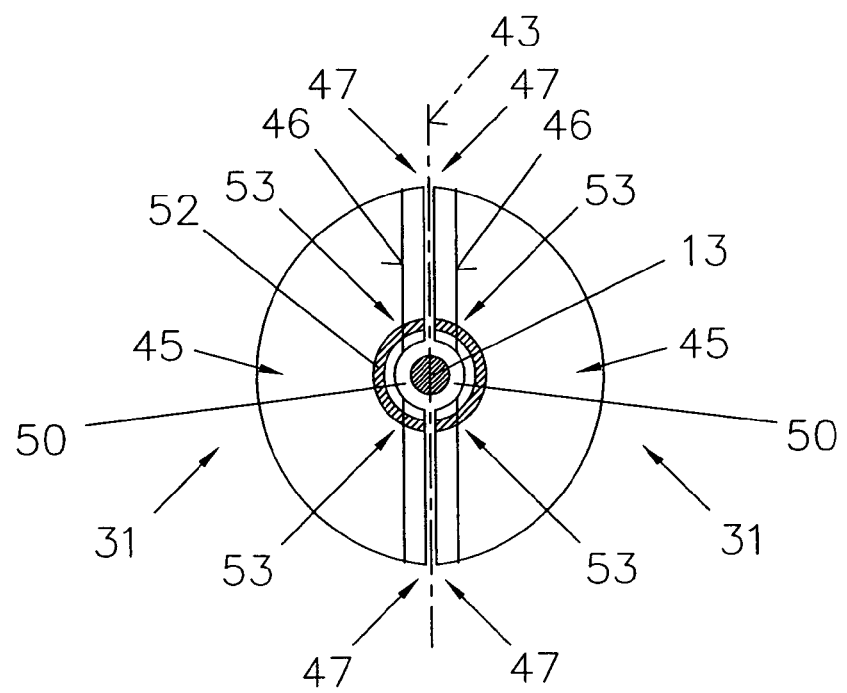
Figure 9:
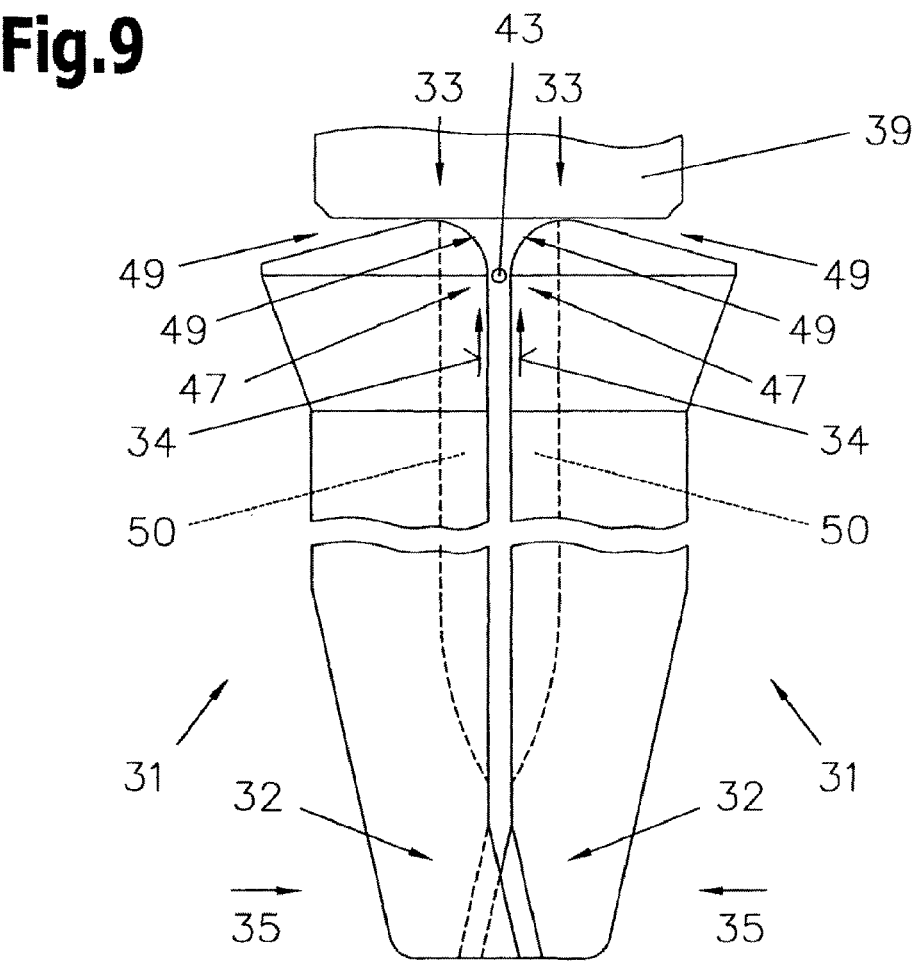
Figure 10:
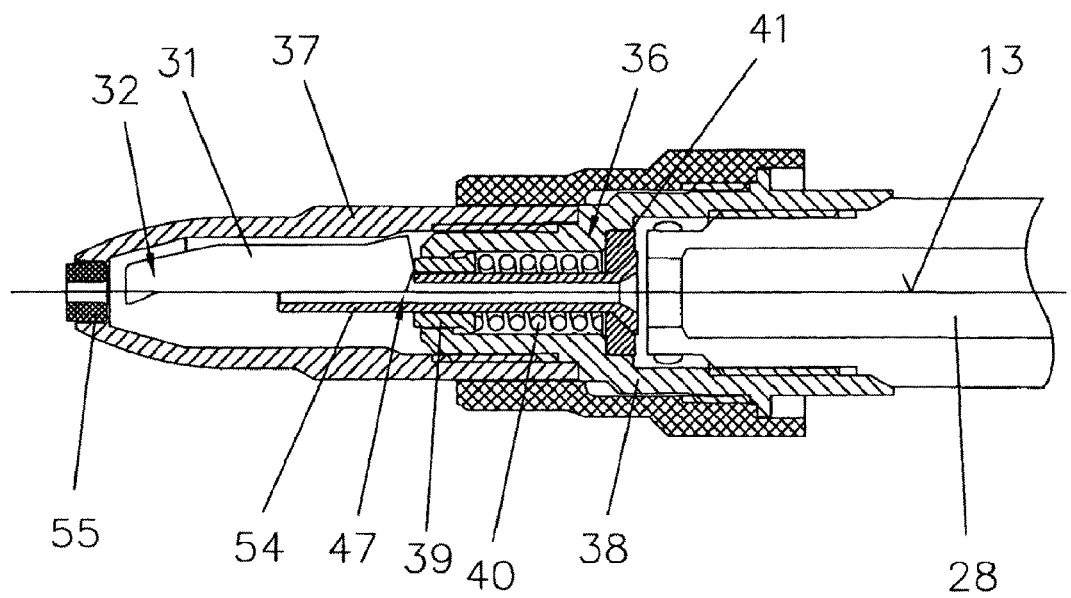
Figure 11:
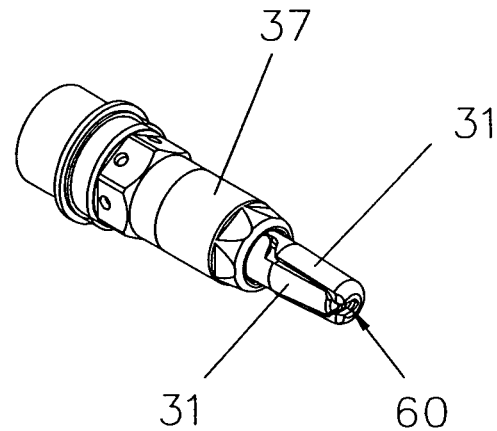
Figure 12:
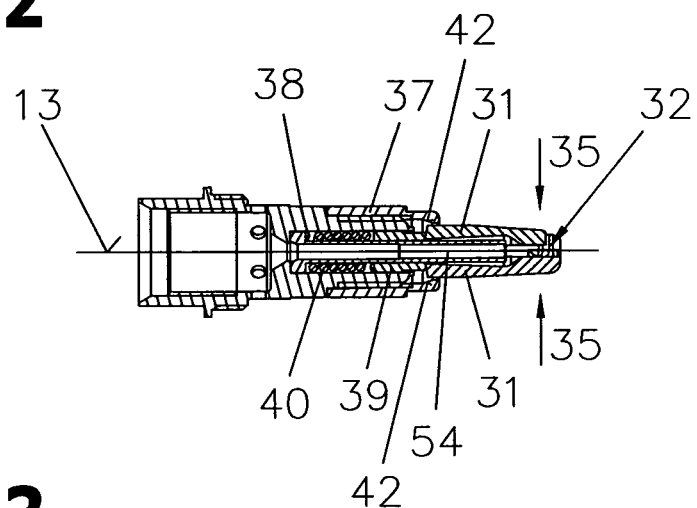
Figure 13:
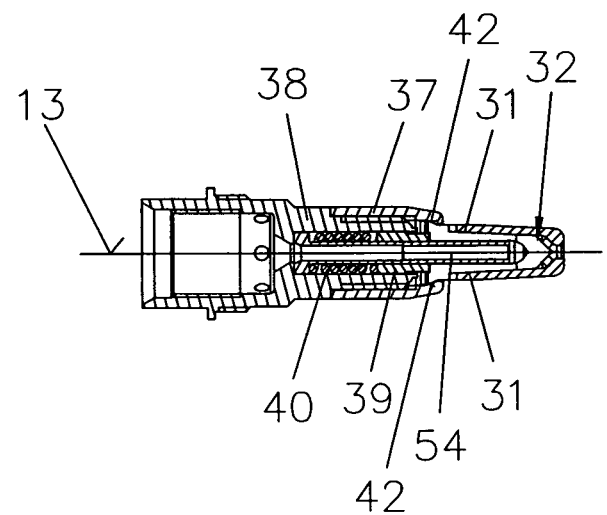
Figure 14:
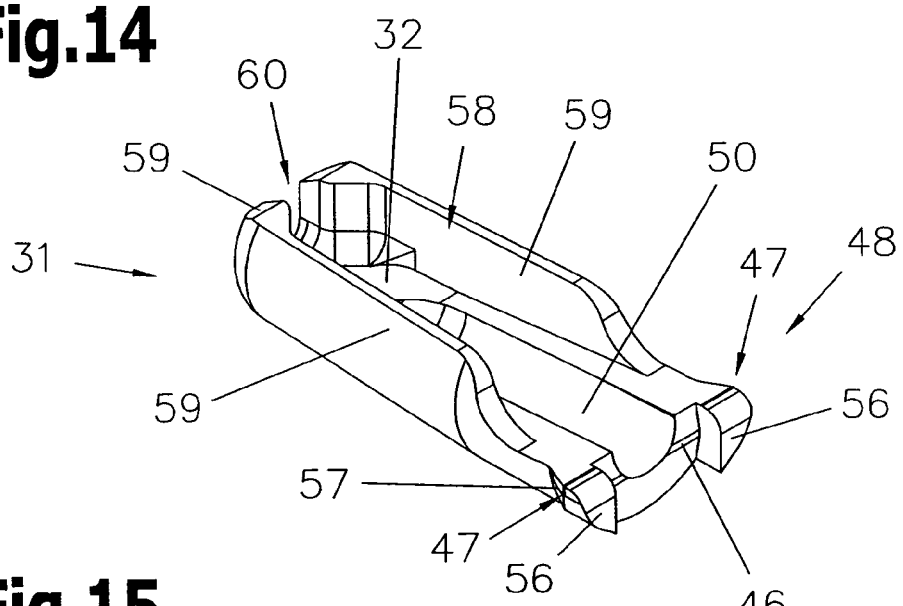
Figure 15:
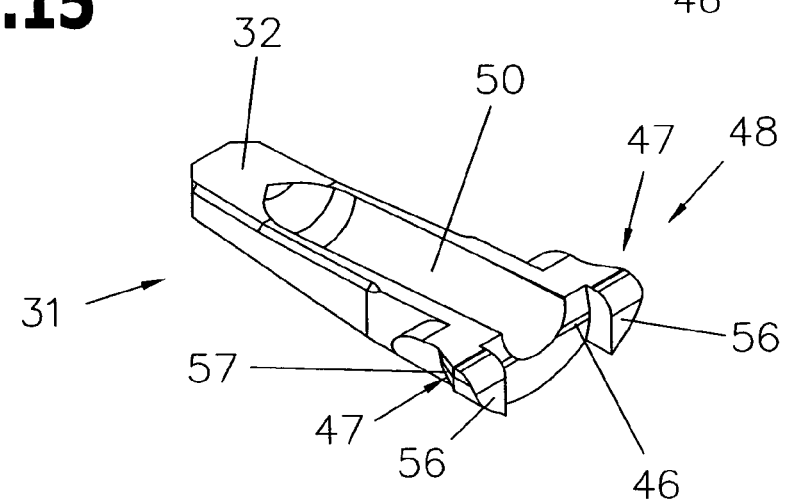
Figure 16:
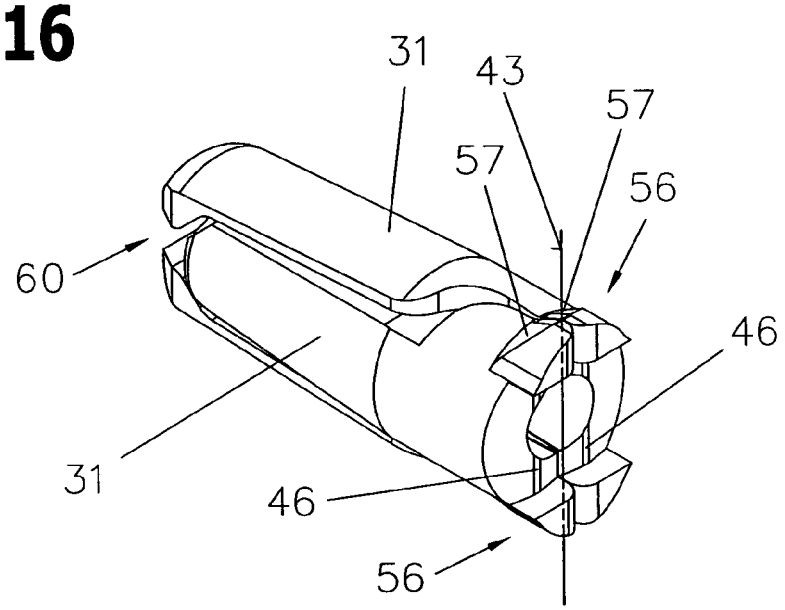

The present invention will be explained in more detail by means of the enclosed, schematic drawings. There show:

FIG. 1 a schematic illustration of a welding machine or a welding device, respectively;

FIG. 2 a welding torch in a schematic exploded view;

FIG. 3 an embodiment of a device according to the invention in a schematic, cut illustration, wherein an inner face of a contact shell is shown;

FIG. 4 the sleeve of the contacting device of FIG. 3 in a schematic, cut illustration;

FIG. 5 a schematic side view of a contact shell of the contacting device;

FIG. 6 a schematic top view of the inner face of a contact shell of the contacting device;

FIG. 7 a schematic view of a contact area of two combined contact shells;

FIG. 8 a schematic top view of a front face of a holding section of two combined contact shells;

FIG. 9 a schematic detailed illustration of two contact shells and of a pressure bolt with the effective forces;

FIG. 10 the device according to the invention in a schematic, cut illustration, wherein a side view of a contact shell is shown; and FIGS. 11 to 16 different views of a further embodiment of a contacting device with differently constructed contact shells.

To begin with, it is stated that equal elements of the variants and embodiments are provided with equal reference numbers.

FIG. 1 illustrates a welding device 1 or a welding plant, respectively, for the most different processes or methods such as, for instance, MIG/MAG welding and/or WIG/TIG welding, or electrode welding methods, twin wire/tandem welding methods, plasma or soldering methods, etc.

The welding device 1 comprises a current source 2 with a power element 3, a control device 4, and a switching member 5 assigned to the power element 3 and/or the control device 4. The switching member 5 and/or the control device 4 is/are connected with a control valve 6 that is positioned in a supply line 7 for a gas 8, in particular an inert gas such as, for instance, $CO_2$, helium, or argon, and the like, between a gas tank 9 and a welding torch 10 or a blowpipe, respectively.

Additionally, a wire feeding device 11 that is common for MIG/MAG welding may be controlled by means of the control device 4, wherein a filler material or a welding wire 13, respectively, is supplied via a supply line 12 from a supply drum 14 and/or a wire coil to the area of the welding torch 10. As a matter of course it is possible that the wire feeding device 11, as is known from prior art, is integrated in the welding device 1, in particular in the basic unit and is not, as illustrated in FIG. 1, designed as an additional device.

It is also possible that the wire feeding device 11 supplies the welding wire 13 or the filler material, respectively, to the processing place externally of the welding torch 10, wherein to this end preferably a non-fusing electrode is arranged in the welding torch 10, as this is usual with WIG/TIG welding.

The current for building up an arc 15, in particular an operating arc, between the non-fusing electrode, not illustrated, and a work piece 16 is supplied via a weld line 17 from the power element 3 of the current source 2 to the welding torch 10, in particular the electrode, wherein the work piece 16 to be welded, which consists of several parts, is, via a further weld line 18, also connected with the welding device 1, in particular with the current source 2, and wherein an electric circuit for a process may hence be built up via the arc 15 or the plasma jet formed, respectively.

For cooling the welding torch 10, the welding torch 10 may, through a cooling circuit 19, with the interposition of a flow monitor 20, be connected with a liquid tank, in particular a water tank 21, so that, when the welding torch 10 is placed into operation, the cooling circuit 19, in particular a liquid pump used for the liquid positioned in the water tank 21, is started and hence a cooling of the welding torch 10 can be effected.

The welding device 1 further comprises an input and/or output device 22 via which the most different welding parameters, operation modes, or welding programs of the welding device 1 may be set and/or called. In so doing, the welding parameters, operation modes, or welding programs set via the input and/or output device 22 are transmitted to the control device 4, and the latter subsequently controls the individual components of the welding plant or of the welding device 1, respectively, and/or predetermines corresponding nominal values for the regulation or control.

Furthermore, in the illustrated embodiment the welding torch 10 is connected with the welding device 1 or the welding plant, respectively, via a hose package 23. The individual lines from the welding device 1 to the welding torch 10 are arranged in the hose package 23. The hose package 23 is connected with the welding torch 10 via a coupling device 24, whereas the individual lines in the hose package 23 are connected with the individual contacts of the welding device 1 via connection jacks and/or plug connections. In order that an appropriate strain relief of the hose package 23 is ensured, the hose package 23 is connected via a strain relief device 25 with a housing 26, in particular with the basic unit of the welding device 1. As a matter of course it is possible that the coupling device 24 is also used for the connection at the welding device 1.

Basically, it has to be mentioned that it is not necessary to use or employ all the afore-mentioned components for the different welding methods and/or welding devices 1, such as, for instance, WIG devices or MIG/MAG devices, or plasma devices. It is, for instance, possible that the welding torch 10 is designed as an air-cooled welding torch 10.

FIG. 2 illustrates a strongly simplified structure of a welding torch 10 (commercial MIG torch). This exploded illustration shows the essential components of the welding torch 10, namely the hose package 23, the coupling device 24, a pipe bend 27, a torch body 28 as a current-carrying element at which finally a contact pipe 29 is fastened, and a gas nozzle 30. The hose package 23 is connected with the pipe bend 27 via the coupling device 24.

The hose package 23 may also be connected to a torch handle, and the torch handle may be connected with the pipe bend 27 via the coupling device 24. In so doing, for connecting the hose package 23 with the torch handle, such a coupling device 24 may also be used. The torch handle may, however, also be designed as an intermediate piece, and a fastening of the welding torch 10 via the intermediate piece may be performed at a robot.

The pipe bend 27 contains inter alia cooling channels, supply lines for the electric energy, supply lines for the gas 8, and in particular the supply line or supply device 12, respectively, for the welding wire 13, the so-called core or wire core, respectively, wherein the latter is supplied to the pipe bend 27 via the hose package 23. The welding wire 13 is conveyed by the wire feeding device from the supply drum 14 via the supply device 12 and/or via an appropriate inner bore in the supply device 12 to the contact pipe 29. In the contact pipe 29, the welding wire 13 is supplied with electric energy, so that an arc welding process may be performed. Accordingly, the contact pipe 29 is manufactured of an electrically conductive and substantially wear-resistant material such as, for instance, copper, copper alloys (tungsten), etc.

As is known from prior art, the contact pipe 29 may also be defined of at least two contact shells 31, wherein the function of contacting is maintained correspondingly. For a stable welding process it is important during contacting that the welding wire 13 is contacted in a contact area 32 as permanently as possible. This contact area 32 is positioned substantially at that end of the contact shells 31 at which the welding wire 13 exits from the contact shells 31.

In accordance with the invention, the contacting required for a stable welding process is solved such that a pressure 33 acts on the contact shells 31, wherein a defined contact force 35 is generated in the contact area 32 with a counter-force 34 acting against the pressure 33, i.e. that the axial pressure 33 acts on the contact shells 31, whereupon the counter-force 34 effects a deflection of the pressure 33 into the radially effecting contact force 35 for compressing the contact shells 31, and a stable and safe contacting in the contact area 32 of the contact shells 31 is hence achieved (see FIG. 9). By that, the welding wire 13 is permanently contacted in the contact area 32.

A pressure mechanism 36 and a sleeve 37 are provided for generating these forces on the contact shells 31. The pressure mechanism 36 is integrated in the centre of a nozzle pipe 38 that is detachably fastened to the torch body 28. The pressure mechanism 36 is defined of a pressure bolt 39, a compression spring 40, and a fixing plate 41. The compression spring 40 is tensioned with the fixing plate 41, so that the movably mounted pressure bolt 39 is capable of exerting the pressure 33 on the contact shells 31. This pressure 33 is, however, only exerted once the sleeve 37 in which the contact shells 31 are positioned to move freely is detachably fastened to the nozzle pipe 38. By the fastening of the sleeve 37, the pressure bolt 39 is pushed back in the direction of the fixing plate 41 by the contact shells 31, so that the pressure 33 is exerted. In correspondence with the compression spring 40 used, a varying pressure is generated. The pressure 33 presses the contact shells 31 against a holding device 42 in the sleeve 37, from which the counter-force 24 correspondingly results. The counter-force 34 acts substantially at the ends of a rotational axis 43 of the contact shells 31. The pressure 33 is exerted on each contact shell 31 substanially parallel and/or adjacent to the rotational axis 43 via the pressure points 53 substantially in the direction of the contact area 32. Due to the pressing of the rotational axis 43 of the contact shells 31 to the holding device 42, a deflection of the effective axial pressure 33 into the radial contact force 35 is achieved. Hence the defined contact force 35 in the contact area 32 results.

The pressure mechanism 36 preferably comprises a feedthrough in the centre through which the welding wire 13 is conveyed. It is, however, also possible that one pressure mechanism or several pressure mechanisms are arranged around the feedthrough for the welding wire 13.

The contacting device according to the invention is illustrated in detail in FIGS. 3 to 10. The pressure 33, the counter-force 34, and the contact force 35 are each indicated with arrows. The pressure mechanism 36 integrated in the nozzle pipe 38 is incorporated into the nozzle pipe 38 from the side of the torch body 28. The pressure bolt 39 is movable along the progression of the welding wire 13 by the spring force of the compression spring 40. The fixing plate 41 always maintains its position. The nozzle pipe 38 is shaped appropriately inside, so that the components of the pressure mechanism 36 which are designed in correspondence with the nozzle pipe 38 are adapted to perform the described function. The fixing plate 41 may, for instance, be screwed into the nozzle pipe 38 up to an abutment, or may be pressed therein. By means of the fixing plate 41, the spring force of the compression spring 40 is also set. The nozzle pipe 38 with the pressure mechanism 36 may be considered as a spare part or wear and tear part, respectively.

The construction of the contact shells 31 that are preferably constructed identically and are thus easy to manufacture is also essential for the contacting device according to the invention. The combination of at least two contact shells 31 substantially yields a contact pipe 29 known from prior art. The combination is substantially performed such that the respective inner faces 44 of the contact shells 31 enclose the welding wire 13. For a transfer according to the invention of the contact force 35 to the welding wire 13, the contact shells 31 have to be movable so as to be able to meet the initially mentioned requirements.

This is achieved by a holding section 48 of the contact shells 31. It comprises a purpose-shaped front face 45 that is in communication with the pressure bolt 39 and enables the conversion of the axial pressure 33 into the radial contact force 35. To this end, on the one hand, the base area of the front face 45 of a contact shell 31 is not a circle, but substantially a circular segment. At the ends of the chord of the circular segment, two contact points 47 result, which ensure the required movability of the contact shell 31. On the other hand, the front face 45 is provided with an elevation 46. This elevation 46 effects that, on fastening of the sleeve 37, the pressure bolt 39 is pushed backward from an abutment in the nozzle pipe 38 and the contact force 35 finally acts on the welding wire 13. The contact shells 31 were arranged and/or inserted in the sleeve 37 substantially such that they are held by the holding section 48 by the holding device 42. The contact shells 31 are fixed with the sleeve 37 and do not comprise any fastening elements of their own. The holding section 48 of the contact shells 31 is opposite to the contact area 32, i.e. at that end of the contact shells 31 at which the welding wire 13 enters (in the case of a conveyance of the welding wire 13 in the direction of the work piece 16). The holding section 48 is designed to be widened vis-à-vis the remaining contact shell 31, wherein the transition to the widening is designed conically. The front face 45 and the elevation 46 are parts of the holding section 48. The elevation 46 virtually divides the front face 45 into two separate sections that are designed to drop obliquely starting out from the elevation 46. This causes clearances 49 to be formed between the front face 45 and the pressure bolt 39, which are decisive for the movability of the contact shells 31.

Preferably, the elevation 46 is arranged in parallel to the chord of the circular segment of the front face 45, wherein the section toward the inner face 44 is substantially smaller than the further section. The inclination from the elevation 46 to the inner face 44 is preferably defined circularly by a radius. Likewise, the inner face 44 comprises a recess 50 in which the welding wire 13 is adapted to move substantially freely. The recess 50 extends substantially up to the contact area 32. Furthermore, the contact area 32 is preferably also designed to be twisted, wherein a face 51 of the contact area 32 is arranged to be staggered with respect to the inner face 44 at a defined angle. Thus, the contact shells 31 effect an additional lateral guidance of the welding wire 13.

In the case of a combination of two contact shells 31 and the arrangement in the sleeve 37, a rotational axis 43 is defined about which the contact shells 31 are adapted to be moved. The rotational axis substantially constitutes the connection between the contact points 47, wherein this connection also corresponds substantially to the chord of the circular segments of the front face 45 in the holding section 48. Since the contact shells 31 are held with the holding section 48 in the holding device 42 of the sleeve 37, the rotational axis 43 is also arranged in the holding device 42. In this respect it is noted that the rotational axis 43 is actually to be considered as a virtual rotational axis 43, since it is to illustrate the mirror-inverted effect of the contact shells 31. Every single contact shell 31 is, due to the opposite contact points 47, correspondingly also rotatable. By means of this rotational axis 43 it is now possible to convert the axial pressure 33 into the radial contact force 35. In detail, this is performed such that the pressure 33 is exerted on the elevation 46 of the front face 45 of the contact shell 31. By the fact that the elevation 46 is arranged in parallel to the rotational axis 43, the contact areas 32 are pressed with the defined contact force 35 against each other and/or against the welding wire 13 passing therebetween. One may also say that the pressure 33 is exerted at the left and at the right adjacent to the rotational axis 43—correspondingly on the elevation 46 of each contact shell 31. The pressure 33 acts substantially correspondingly in the direction of the contact area 32. For converting the axial pressure 33 into the radial contact force 35, the rotational axis 34 is preferably positioned below the elevation 46, so that it is possible to regulate the contact force 35 by means of the lever rule, and the movability of the contact shells 31 is given.

The defined contact force 35 (for instance, 2 N per contact shell 31) results from the pressure 33 (for instance, 80 N), the distance between the elevation 46 and the rotational axis 43 (for instance, 1 mm), the length of the contact shell 31 (for instance, 20 mm), and the counter-force 34 (for instance, 40 N per contact point 47). The counter-force 34 is influenced by the angle of the conical transition to the holding section 48, which is correspondingly also defined in the holding device 42 of the sleeve 37. The forces are in particular adapted to the diameter and the material of the welding wire 13.

Basically, all forces are primarily dependent on the pressure 33. In addition, however, the contact force 35 is also dependent on the lever rule, i.e. the relation of the distance of the elevation 46 and the rotational axis 43 to the distance between the rotational axis 43 and the end of the contact area 32 of the contact shell 31. These forces appear once the sleeve 37 with the contact shells 31 arranged therein is fastened to the nozzle pipe 38. The fastening of the sleeve 37 is defined by a corresponding abutment at the nozzle pipe 38, so that the defined contact force 35 is finally set. Preferably, the pressure 33 is exerted by the pressure mechanism 36 only in places on the elevations 46 of the contact shells 31, so that the conversion of the forces via the rotational axis 43 is facilitated. This means that the pressure bolt 39 does not abut with its entire surface on the front face 45 of the contact shells 31, but only in places. Thus, the contact shells 32 are held movably in the sleeve 37 even if a corresponding pressure 33 acts thereupon.

So if the pressure mechanism 36 exerts the pressure 33 on the contact shells 31, they are compressed or closed, respectively, in the contact area 32 due to the contact force 35 resulting from the pressure 33. In this case, the outer clearance 49 has its maximum height. When the welding wire 13 is conveyed through the contact shells 31, the contact shells 31 are pressed apart in the contact area 32 substantially normally to the welding wire 13, so that the contact force 35 acts on the welding wire 13 via the contact shells 31. Hence, the outer clearance 49 is reduced. Despite the effect of the pressure 33, the contact shells 31 that are designed as wear and tear parts are thus arranged movably in the sleeve 37 in accordance with the invention. This movability is caused in particular by the combined oval and convex front face 45 of the contact shells 31. The oval shape is defined by the circular segments and the convex shape by the elevation 46. The convex face comprises a deepening along the rotational axis 43, which causes the rotational axis 43 to be below the elevations 46, so that the deflection of the axial pressure 33 into the radial contact force 35 is facilitated.

The oval face may be seen from the top view of the holding section 48 and/or of the front face 45 of the combined contact shells 31 in FIG. 8. This also illustrates the recesses 50 for the welding wire 13 which define a circle.

Thus, it is possible to guide the welding wire 13 substantially in the centre of the contact shells 31. Correspondingly, the welding wire 13 is also guided in the centre of the pressure mechanism 36, i.e. through the fixing plate 41, the compression spring 40, and the pressure bolt 39. Accordingly, the preferably cylindrical pressure bolt 39 comprises a front face corresponding to a circular ring 52 (shaded area). This circular ring 52 extends around the circle defined by the recesses 50. The circular ring 52 defines substantially four pressure points 53 on the elevations 46 of the contact shells 31 on which the pressure 33 is exerted in places. Via the pressure points 53, at least part of the welding current is transmitted to the contact shells 31, and also the heat generated during a welding process in the contact shells 31 is dissipated there. The remaining portion of the welding current is transmitted via the sleeve 47 and the contact points 47 to the contact shells 31. Via this path, the remaining portion of the heat is also dissipated.

Another basic requirement for a stable and constant contacting is the centrical guidance of the welding wire 13. This is implemented by a guide pipe 54 that extends through the entire pressure mechanism 36 and across the recess 50. Thus, the welding wire 13 is guided up to the contact area 32 and contacted in the contact area 32 independently of the contact shells 31.

The twisted contact area 32 of the contact shells 31 also provides a guidance of the welding wire 13. The welding wire 13 is hence not just contacted and guided by the pressure of the contact shells 31, but also guided laterally by the inclined faces 51 of each contact shell 31. Thus, on the one hand, a better contacting is achieved and, on the other hand, a lateral guidance. This lateral guidance is, however, to be considered as an additional feature since the contact shells 31 mainly are to ensure the permanent contacting of the welding wire 13. This has a positive effect in particular on the material transfer and hence on the entire welding process since the welding wire 13 is always contacted in the same place. The substantial guidance of the welding wire 13 is performed by the guide pipe 54 and the sleeve 37 in which an insulation bushing 55 is arranged for guidance. The welding wire 13 exits after the contacting in the contact area 32 through the insulation bushing 55 from the sleeve 47. The contact shells 31 are completely arranged in the sleeve 37 and are thus also protected efficiently from influences of the welding process such as heat and weld spatters. For this purpose, the insulation bushing 55 is designed to be correspondingly heat-resistant and wear-proof, for instance, of silicon nitrate. The guide pipe 54 is appropriately adapted to the diameter of the welding wire 13 and/or to a range of diameters of welding wires 13. The guide pipe 54 may also be exchanged easily since it is merely inserted from the rear into the pressure mechanism 36 and the contact shells 31. Preferably, the guide pipe 54 is also designed for a low-friction transfer of the welding wire 13 from the supply line 12 and/or the wire core, respectively. The function of the guide pipe 54 may also be assumed by the pressure bolt 39 in that its design is combined with the guide pipe 54.

In general, it is noted that the pressure 33 may be set with the fixing plate 41, so that, for instance, an adaptation to the material and the diameter of the welding wire 13 is possible. As a matter of course, several different welding wires 13 may also be used with a combination of the compression spring 40 and the fixing plate 41.

For a easier handling it is preferably provided that the fixing plate 41 is screwed up to an abutment and the required pressure 33 for the defined contact force 35 is set automatically.

The known grinding of the contact areas 32 is also compensated by the construction in accordance with the invention. In the case of variations of the welding wire 13, for instance, due to cast, the contact shells 31 follow the progression of the welding wire 13. Thus, additional forces in the contact area 32 are avoided or at least reduced, and the contact force 35 remains substantially constant. The contact force 35 acting on the welding wire 13 is readjusted substantially automatically, since in accordance with the contacting device according to the invention the contact shells 31 always act against each other. The decisive factor for this is the already described movability of the contact shells 31.

FIGS. 11 to 16 illustrate a further embodiment of a contacting device according to the invention in which the contact shells 31 have different structures. Like with the already described construction of the contacting device with identically constructed contact shells 31 pursuant to FIGS. 3 to 10, these have to be movable. In the following, only the differences with respect to the already described contacting device with identical contact shells 31 will be dealt with.

The movability of the two contact shells 31 is enabled by the holding section 48 defined by two opposite projections 56 per contact shell 31 which project laterally and above the front face 45. Basically, the projections 56 are arranged in the area of the inner face 44 of the contact shells 31. Laterally, the projections 56 are each connected with the outer face of the contact shell 31 via the conical face 57 tapering in the direction of the outer face of the contact shell 31. One may also say that the conical face 57 is designed to taper. These conical faces 57 enable the movable holding of the contact shells 31 in the holding device 42 of the sleeve 37 and prevent simultaneously the falling out of the contact shells 31, since the lateral projections 56 protrude. Since the front face 45 of the contact shell 31 substantially has the shape of a circular segment, sufficient clearance to the holding device 42 is available along the outer face of the contact shells 31, so that no friction between the outer face of the contact shells 31 and the holding device 42 occurs here. Furthermore, during the use of the contact shells 31 in the welding torch, i.e. in the sleeve 37, each projection 57 comprises a contact point 47 that is substantially arranged on the conical face 57. In order that the contact point 47 is not deformed and/or modified by the forces acting thereupon, the projections 56 are also positioned above the front face 45 and serve substantially for material reinforcement. By the connection of the contact points 47, the rotational axis 43 is defined around which the contact shells 31 move. The elevation 46 on which the pressure bolt 39 exerts the pressure 33 is arranged between the projections 56, as was already described in detail by means of FIGS. 3 to 10. The result of this is that the elevation 46 and the rotational axis 43 run indeed in parallel, but are positioned approximately in one level. Thus, the friction between the elevation 46 and the pressure bolt 39 which is produced due to the movement of the contact shells 31 during the conveyance of the welding wire 13 is substantially reduced, since the pressure points 53 substantially do not change during the movement of the contact shells 31 about the rotational axis 43 that is positioned approximately on the same level. This means that the position of the pressure bolt 39 substantially does not change, so that it need not be moved from the elevation 46 against the pressure 33 during the movement of the contact shells 31 against the direction of the contact force 35. Thus, the position of the elevation 46 is substantially not changed, either, during the movement of the contact shells 31. The movement of the contact shells 31 is, on the one hand, necessary during the threading in of the welding wire 13 in that the pre-tensioned contact shells 31 are moved against the contact force 35 and the contact force 35 acts correspondingly on the welding wire 13. On the other hand, deformations (cast) of the conveyed welding wire 13 are compensated by the movements of the contact shells 31.

By modifying the distance between the rotational axis 43 and the elevation 46 which extend in parallel, it is further possible to set the contact force 35 by means of the lever rule by using other contact shells 31. From the pressure 33 there results the contact force 35 in the contact area 32 that is positioned differently due to the contact shells 31 of different construction. This results from the fact that the contact shells 31 have different lengths, wherein the shorter contact shell 31 is protected by the longer contact shell 31. This means that the gap between the contact shells 31 which is necessary for the movability is protected from welding spatters, and that hence the movability and the function of the contact shells 31 are not impaired. It is therefore also sufficient if the sleeve 37 substantially receives the holding section 48 and does not encase or enclose, respectively, the entire contact shells 31 as described pursuant to FIGS. 1 to 10.

In a constructional view this protection is, for instance, solved such that substantially the longer contact shell 31 receives the shorter contact shell 31. The longer contact shell 31 thus comprises a recess 58 receiving the shorter contact shell 31. This recess 58 is substantially formed such that walls 59 are arranged at the sides and at the front face—i.e. at the exit end of the welding wire 13—which restrict the recess 58 correspondingly. Thus, the gap between the contact shells 31 is protected in the recess 58 from weld spatters, dirt, and the like. The depth of the recess 58 reaches down to the level in which the welding wire 13 is guided. In the front-side wall 59 of the longer contact shell 31, an opening 60 for the welding wire 13 is arranged. The contact area 32 in the longer contact shell 31 is positioned upstream of this opening 60, so that the contact area 32 is protected by the front-side wall with the opening 60. The contact area 32 of the shorter contact shell 31 is accordingly positioned at the very front.

Thus, the contact shells 31 are designed equally in the holding section 48, but have different shapes in the area down-stream of the holding section 48 up to inclusively the contact area 32. Thus, the width of this area is, with the shorter contact shell 31 that engages into the recess 58 of the longer contact shell 31, substantially equal to the width of the contact area 32. Hence, after the conical face 57, an additional transition from the holding section 48 to this area is arranged, so that the shorter contact shell 31 is designed substantially with three different widths. Contrary to this, with the longer contact shell 31 the width of the recess 58 is substantially equal to the width of the contact area 32. The longer contact shell is, however, also designed with two different widths. Accordingly, the lateral walls 59 of the recess 58 also end in front of the holding section 48.

The opening 60 of the front-side wall 59 may also be designed as a groove, so that the opening 60 is independent of the diameter of the welding wire 13.

The invention claimed is:

1. A device for contacting a welding wire in a welding torch, the device comprising:
   a) a nozzle pipe (38);
   b) a pressure mechanism (36) integrated in said nozzle pipe (38);
   c) a sleeve (37) fastened to said nozzle pipe (38); said sleeve (37) comprising a holding device (42); and
   d) at least two contact shells (31) arranged inside said sleeve (37) and movable about a rotational axis (43)

oriented substantially perpendicular to a longitudinal axis of said contact shells (31), each of said at least two contact shells (31) comprising:
  i) a contact area (32) disposed at a front end of said contact shell (31) at which front end the welding wire exits said contact shell, said contact area (32) contacting the welding wire with a radially-effecting contact force (35); and
  ii) a holding section (48) disposed opposite said contact area (32) at a rear end of said contact shell (31) at which rear end the welding wire enters said contact shell (31), the holding section comprising:
    a front face (45) having a base area formed as a substantially circular segment and two contact points (47) disposed at opposite ends of a chord of said substantially circular segment, said rotational axis (43) corresponding to said chord connecting said two contact points (47); and
    an elevation (46) positioned parallel to and above said rotational axis (43), said elevation (46) dividing said front face (45) into separate sections dropping obliquely starting from said elevation (46), thereby forming an outer clearance (49) between said front face (45) and said pressure mechanism (36);
  wherein when said pressure mechanism exerts an axial pressure (33) on said elevation (46) of said contact shells (31), said contact points (47) of said contact shells (31) are pressed against said holding device (42) of said sleeve (37), producing a counter-force (34) acting substantially on the ends of the rotational axis (43), the axial pressure (33) is converted into the radially-effecting contact force (35) via the counter-force (34) and the outer clearance (49) has a maximum height; and
  wherein when the welding wire is conveyed through said contact shells (31), said contact shells (31) are pressed apart in said contact area (32) substantially normal to the welding wire and said outer clearance (49) is reduced.

2. The device according to claim 1, wherein guides are provided for guiding the welding wire upstream and downstream of the contact area.

3. The device according to claim 1, wherein the contact shells are movable in the contact area by the contact force substantially normally to the welding wire.

4. The device according to claim 1, wherein the holding section is designed as the area of entry of the welding wire and comprises an oval and convex front face, and wherein the pressure is exerted on at least a part of the front face.

5. The device according to claim 1, wherein the holding section is designed to be widened vis-à-vis the further contact shell, and wherein the transition to the widening is designed conically.

6. The device according to claim 1, wherein the sleeve comprises a recess substantially corresponding to the contact shells.

7. The device according to claim 1, wherein an insulation bushing for guiding the welding wire is provided in the sleeve.

8. The device according to claim 1, wherein a guide pipe for the welding wire is arranged in the center of the pressure mechanism and in a part of the contact shells.

9. The device according to claim 1, wherein the pressure mechanism is defined at least by a pressure bolt, a compression spring, and a fixing plate, and wherein the pressure bolt is movable substantially along the axis of the welding wire.

10. The device according to claim 1, wherein it is designed for receiving contact shells.

11. A method for contacting a welding wire in a welding torch, the method comprising steps of:
  a) providing a nozzle pipe (38), a pressure mechanism (36) integrated in the nozzle pipe (38), and a sleeve (37) fastened to the nozzle pipe (38), wherein the sleeve (37) comprises a holding device;
  b) arranging at least two contact shells (31) inside the sleeve (37) and movably about a rotational axis (43) oriented substantially perpendicular to a longitudinal axis of the contact shells (31), wherein each of the at least two contact shells (31) comprises:
    a contact area (32) disposed at a front end of the contact shell (31) at which front end the welding wire exits said contact shell, the contact area (32) contacting the welding wire with a radially-effecting contact force (35); and
    a holding section (48) disposed opposite the contact area (32) at a rear end of the contact shell (31) at which rear end the welding wire enters the contact shell (31), the holding section comprising:
      a front face (45) having a base area formed as a substantially circular segment and two contact points (47) disposed at opposite ends of a chord of the substantially circular segment, the rotational axis (43) corresponding to the chord connecting the two contact points (47); and
      an elevation (46) positioned parallel to and above the rotational axis (43), the elevation (46) dividing the front face (45) into separate sections dropping obliquely starting from the elevation (46), thereby forming an outer clearance (49) between the front face (45) and the pressure mechanism (36);
  c) exerting a pressure (33) in an axial direction on a respective elevation (46) of the at least two contact shells (31), thereby pressing the two contact points (47) of the contact shells (31) against the holding device (42) of the sleeve (37) to generate a counter-force (34) and converting the pressure (33), via the counter-force (34), into the radially-effecting contact force (35) contacting the welding wire in the contact area (32), such that the outer clearance (49) has a maximum height; and
  (d) conveying the welding wire through the contact shells (31), such that the contact shells (31) are pressed apart in the contact area (32) substantially normal to the welding wire and the outer clearance (49) is reduced.

12. The method according to claim 11, wherein the axial pressure is exerted on each contact shell in places and in parallel to the rotational axis.

13. The method according to claim 11, further comprising steps of:
  providing a device for contacting a welding wire in a welding torch, the device comprising the at least two contact shells,
  fastening the sleeve to a nozzle pipe having an integrated pressure mechanism, wherein the pressure mechanism is designed to exert the pressure on the contact shells and
  forming the elevation for exerting the pressure in axial direction at the front face of the holding section of each contact shell,
  wherein the contact shells are held movably in the sleeve via the two contact points.

* * * * *